(No Model.) 2 Sheets—Sheet 2.
T. W. BLACKERBY.
ANIMAL TRAP.
No. 472,651. Patented Apr. 12, 1892.
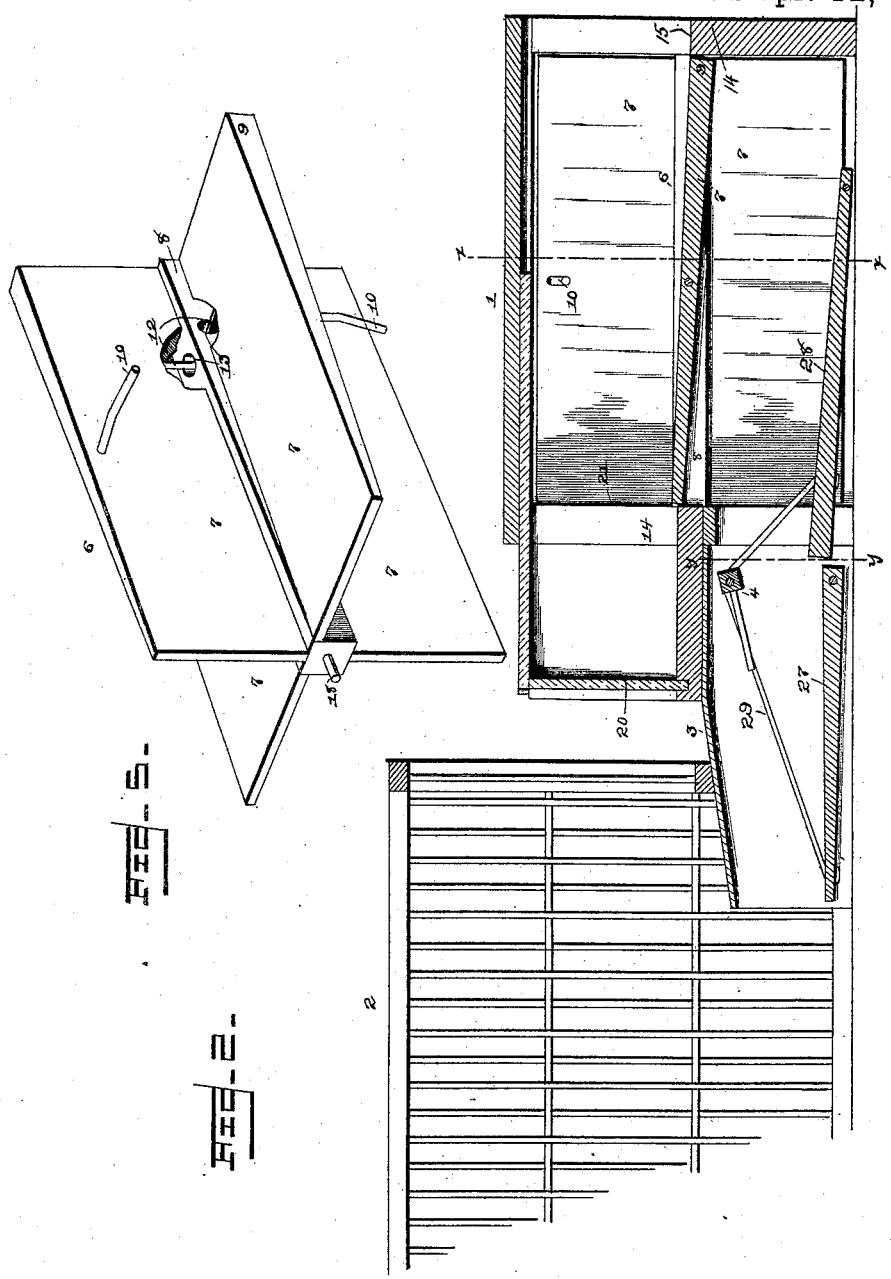
Witnesses
Inventor
Thomas W. Blackerby
By his Attorneys,

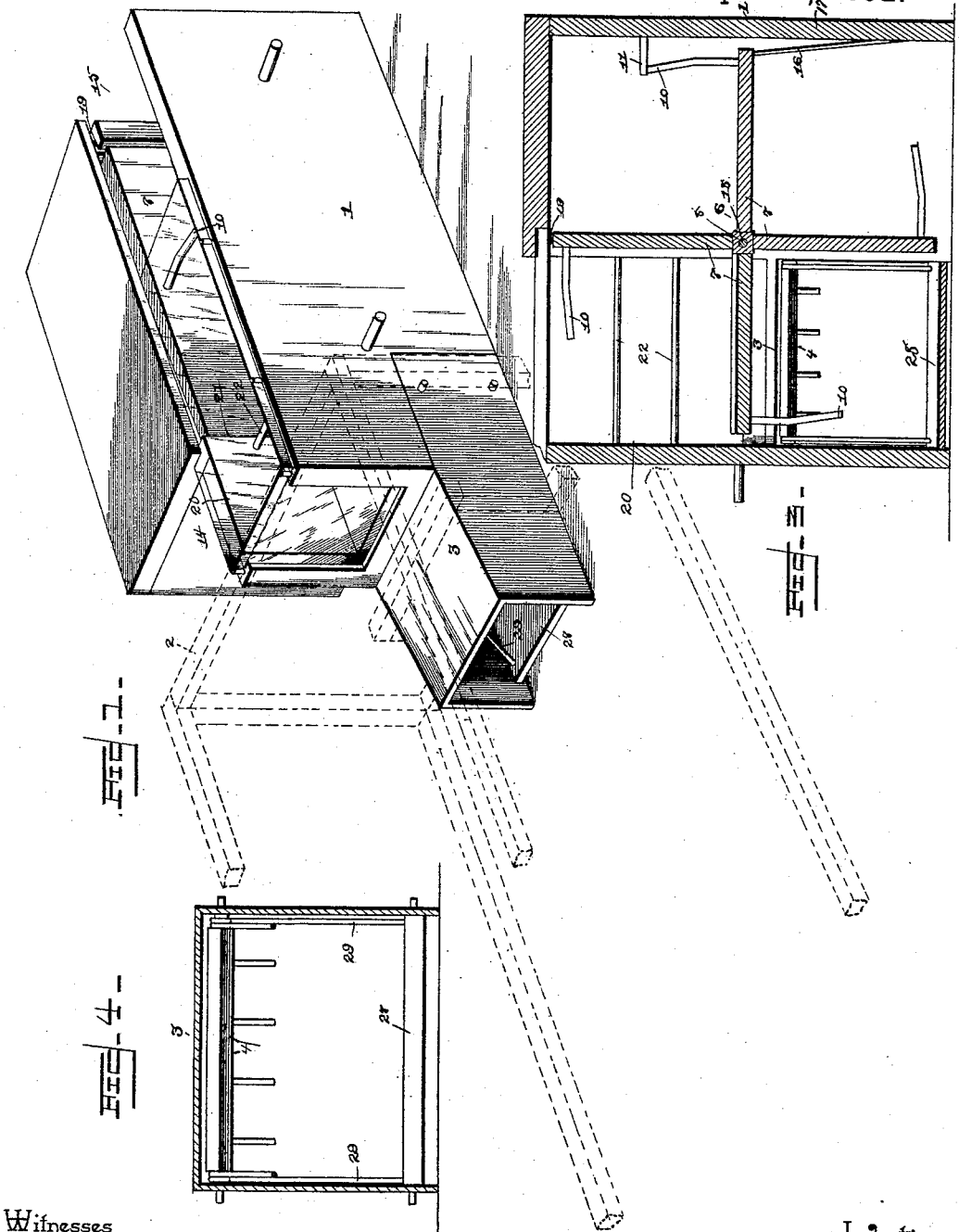

UNITED STATES PATENT OFFICE.

THOMAS W. BLACKERBY, OF MACKVILLE, KENTUCKY.

ANIMAL-TRAP.

SPECIFICATION forming part of Letters Patent No. 472,651, dated April 12, 1892.

Application filed June 15, 1891. Serial No. 396,386. (No model.)

*To all whom it may concern:*

Be it known that I, THOMAS W. BLACKERBY, a citizen of the United States, residing at Mackville, in the county of Washington and State of Kentucky, have invented a new and useful Trap, of which the following is a specification.

The invention relates to improvements in animal-traps.

The object of the present invention is to simplify and improve the construction of self-set and ever-set traps and to provide one adapted for small animals—such as rats and the like—and capable of caging any number of animals.

The invention consists in the construction and novel combination and arrangement of parts hereinafter fully described, illustrated in the accompanying drawings, and pointed out in the claims hereto appended.

In the drawings, Figure 1 is a perspective view of a trap constructed in accordance with this invention. Fig. 2 is a longitudinal sectional view. Fig. 3 is a transverse sectional view on line $x$ $x$ of Fig. 2. Fig. 4 is a similar view on line $y$ $y$ of Fig. 2. Fig. 5 is a detail perspective view of the trap-door partly broken away.

Referring to the accompanying drawings, 1 designates a frame of a trap, which is designed to be used in connection with a cage 2 and which is connected therewith by a passage or conduit 3, provided with a swinging door 4 to permit the entrance of animals to the cage 2 and to prevent their escape therefrom. The frame 1 of the trap is preferably rectangular in cross-section and has longitudinally disposed within it a trap-door 6, which is pivotally mounted and is adapted to rotate by the weight of an animal to spring and set the trap. The trap-door consists of four blades 7, which are arranged at angles to each other and form a Greek cross in cross-section, and are secured in pairs, those in the same plane being rigidly connected to each other. The blades are centrally pivoted to a bar 8 and have their ends 9 weighted, and are capable of a limited swing to carry stems 10 out of engagement with a stop 11 to spring the trap and rotate the trap-door to precipitate an animal and confine the same. The swing of the blades is limited by pins 12, which connect each pair of blades at the weighted ends of the latter and are arranged in openings 13 of the central bar 8, which is journaled in the ends 14 of the frame 1. The stems 10 project from similar sides of the blades 7, and the stem 10 of the horizontal blade adjacent the stop engages the same, and when an animal enters through an opening 15 it walks on the weighted portion 9 of a blade until after it passes a central pivotal point, when it swings or tilts the blade sufficiently to carry the stem 10 out of engagement with the stop to rotate the trap-door and spring the trap. Retrograde rotation of the trap-door is prevented by a spring 16, which is secured to the side 17 of the frame and has its free end engaging the lower face of the blade, which has its stem 10 engaging the stop 11. The bar 8 is preferably journaled by pins 18, which are arranged on the bottoms of kerfs 19 in the inner faces of the ends 14 of the frame.

The bait for attracting animals is placed in a compartment 20, which is arranged at one end of the frame opposite an opening 21 and is separated from the frame by horizontal bars 22, which enable live bait to be placed in the bait-compartment 20 without danger of getting on the blades of the trap-door and trapping itself. The top of the trap is provided with a glass section and the outer end of the bait-compartment is preferably constructed of glass. An animal is precipitated in the space below the trap-door, and that space communicates with the passage or conduit 5, leading to the cage in which animals are confined. The swinging or oscillating door is constructed of parallel wires 23, which are secured to a bar 25, journaled in the top of the passage or conduit 3 and is adapted to be turned to open and close the door, which is operated by pivoted boards or treadles 27 and 28, connected with the ends of the journaled bar 25 by cords or wires 29 or the like. The cords are wound on the ends of the journaled bar, and as the treadles or pivoted boards are depressed or tilted the cords wind or unwind and oscillate the door to open and close it. The door 4 is designed to be maintained normally open; but as soon as an animal depresses the free end of the treadles 27 the door will be closed to prevent the escape of an animal. The pivoted board or treadle 28 is arranged beneath the trap-door, and as soon as an animal is precipitated it falls upon the treadle or pivoted board and holds the door 4 open. The animal then passes through the doorway into the cage, in which it is confined. The cords 29 each have an end attached to the free end of the treadle or pivoted board 28, which has its free end weighted and adapted to hold the oscillating door 4 open, and the other ends of the cords 29 are attached to the free end of the treadle or board 27, which has its free end arranged adjacent to and extending within the cage 2 and is adapted to be depressed by an animal in attempting to leave the cage, whereby the oscillating door 4 is closed and the escape of an animal is prevented.

It will be seen that the trap is simple in its construction and operation, and is positive and reliable, and is adapted to be sprung and reset by an animal.

What I claim is—

1. In a trap, the combination of the frame, the trap-door comprising the blades arranged at an angle to one another and secured in pairs, each pair being pivoted and being capable of a limited longitudinal oscillation or swing, the stems projecting from similar sides of the blades, and a stop arranged to be engaged by the stems which are carried out of engagement by the tilting of the blades, substantially as described.

2. In a trap, the combination of the frame, the trap-door comprising the bar 8, journaled in the frame and provided with openings, the weighted blades pivoted to the bar and arranged in pairs and the pins connecting the blades of each pair and arranged in the openings of the bar and limiting the oscillation of the blades, a stop, and stems projecting from similar sides of the blades and arranged to engage the stop and adapted to be carried out of engagement by the tilting of the blades, substantially as described.

3. In a trap, the combination of a cage, a passage or conduit communicating therewith, an oscillating door having a cross-bar journaled in the passage or conduit, a board or treadle pivotally mounted, and a cord wound around the cross-bar and connected with the treadle or board, whereby the door is opened and closed by the tilting of the treadle, substantially as described.

4. In a trap, the combination of a cage, a passage or conduit communicating therewith, an oscillating door having a cross-bar journaled in the passage or conduit, a board or treadle pivotally mounted, a cord wound around the cross-bar and connected to the treadle or board, and a weight for holding the door normally opened or closed, substantially as described.

5. In a trap, the combination of a cage, a passage or conduit communicating therewith, an oscillating door having a cross-bar journaled in the passage or conduit, a cord wound around the cross-bar, the treadle 28, pivotally mounted in the passage or conduit and having its free end weighted and connected with one end of the cord and adapted to hold the door open, and the treadle 27, pivotally mounted in the passage or conduit and connected with the other end of the cord and adapted to be depressed to close the door, substantially as described.

In testimony that I claim the foregoing as my own I have hereto affixed my signature.

THOMAS W. BLACKERBY.

Witnesses:
JOHN H. SIGGERS,
R. W. DAYTON.